J. LAZARUS.
ELASTIC TIRE.
APPLICATION FILED DEC. 12, 1910.

1,017,980. Patented Feb. 20, 1912.

Witnesses.
Franklin E. Low.
Leonard A. Powell.

Inventor:
Joseph Lazarus,
by his attorney, Charles N. Gooding.

UNITED STATES PATENT OFFICE.

JOSEPH LAZARUS, OF BOSTON, MASSACHUSETTS.

ELASTIC TIRE.

1,017,980.  Specification of Letters Patent.  Patented Feb. 20, 1912.

Application filed December 12, 1910. Serial No. 596,770.

*To all whom it may concern:*

Be it known that I, JOSEPH LAZARUS, a citizen of the United States, residing at Boston, in the county of Suffolk and State of Massachusetts, have invented new and useful Improvements in Elastic Tires, of which the following is a specification.

This invention relates to improvements in tires for vehicle wheels, and the object is to provide an inexpensive yet durable elastic tire which shall be capable of a highly sensitive local elastic yielding similar in its action to that of a pneumatic tire.

Another object is to provide a novel and practical means of attaching the tire to the periphery of the wheel.

Still another object is to provide a tire which shall be non-skidding.

To these ends, my invention consists in the novel features of construction and in the combination and arrangement of parts set forth in the following specification and particularly pointed out in the claims.

Figure 2:
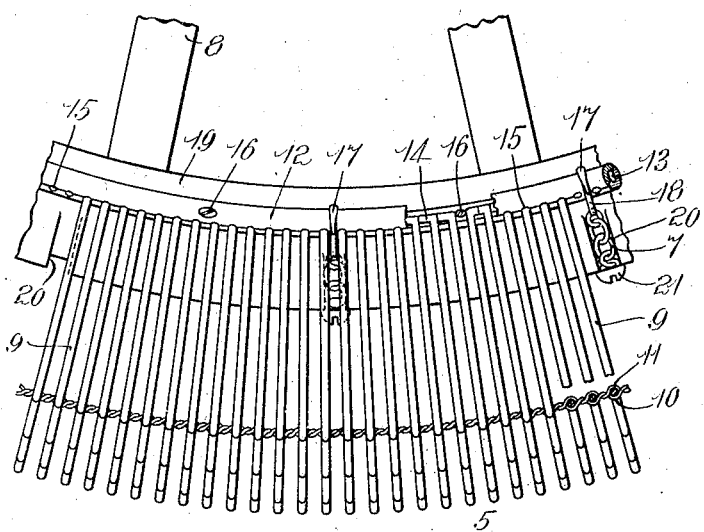
Figure 4:
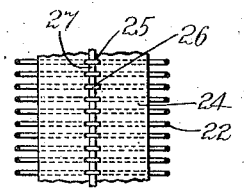
Figure 3:
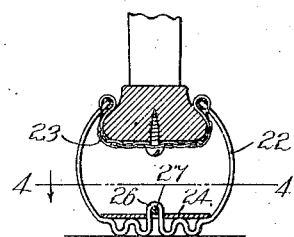
Figure 1:
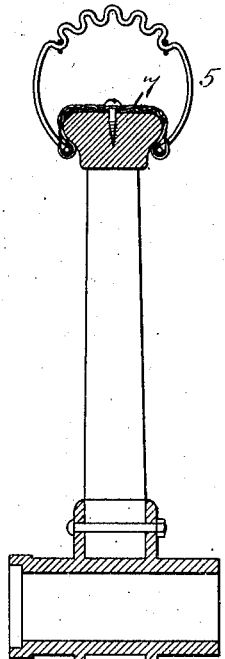
Figure 1:
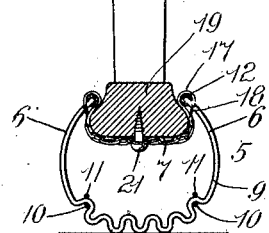

Referring to the drawing: Figure 1 is a central vertical section of a tire and wheel embodying my invention. Fig. 2 is an enlarged detail side elevation of a portion of the tire and wheel. Fig. 3 is a cross sectional view of a modified form of the tire. Fig. 4 is a plan section taken on line 4—4 of Fig. 3.

Like numerals refer to like parts throughout the several views of the drawing.

In the drawing, referring to Figs. 1 and 2, the numeral 5 designates generally an elastic tire having two resilient sides 6 connected to each other by a suitable connection or connections 7 forming an annular trough-like structure in which the periphery of a wheel 8 is located. The tire is preferably a metallic structure and is preferably composed of a series of transverse substantially U-shaped springs 9. These springs are preferably joined to each other adjacent to the tread by suitable means to prevent relative displacement of said springs in a circumferential direction, such means in the embodiment shown in Figs. 1 and 2 consisting of a plurality of wires interlaced, intertwined or otherwise interlocked with the springs 9 in any suitable manner, while in the embodiment illustrated in Figs. 3 and 4, I have shown a single wire associated with and locked to the transverse springs. In the embodiment shown in Figs. 1 and 2, there are shown two pairs of wires, the wires of each pair being designated by the numerals 10 and 11 and the wires of each pair being twisted about each other and about the springs, in the manner shown in Fig. 2. The springs 9 may be and preferably are bent to form corrugations, as shown in Fig. 1, these corrugations serving to prevent the tire from slipping or skidding sidewise and insuring a good gripping action upon the pavement so as to prevent circumferential slipping of the wheel as well. The upper extremities of the springs 9 are joined to each other at each side by suitable means, preferably consisting of two circumferential side members 12, 12 each of which is formed in two parts forming therebetween an annular chamber 13 formed by providing each of the two parts with an annular groove. Each of the springs 9 is provided with a laterally bent end portion 14 located in one of the annular chambers 13, while the adjacent body portion of the spring extends through a perforation 15 formed partly in each of the two parts of the ring 12, as shown in Fig. 2. The two parts of each ring 12 are secured to each other by suitable means such, for example, as screws 16. The connections 7 preferably consist of a series of chains having terminal hooks 17 hooked onto the rings 12, these hooks being preferably of the "snap" variety having springs 18 for preventing accidental escape of the rings from the hooks. Preferably, the wheel 8 is provided with a felly 19 which swells out or widens toward its periphery, as shown in Fig. 1, in such a manner that the tire engages the felly at its narrower portion and is thus prevented from becoming accidentally disengaged therefrom. It will be evident that when the weight of the vehicle rests upon the tire at a given point in its circumference as, for example, as shown at the lower part of Fig. 1, the sides of the tire will tend to draw inwardly toward each other and at the same time will have a tendency to play up and down to a slight degree upon the felly, yet at the same time engaging the same with quite a considerable firmness. This gripping action may, in some cases, be sufficient to prevent the tire from creeping or slipping circumferentially on the wheel, but where the vehicle is a motor driven vehicle, I prefer to attach the tire to the wheel in some positive manner as, for example, by providing the felly 19 with a series of transverse grooves 20 in which the chains 7 are respectively located and further by securing said chains to said felly by means of screws 21.

Referring now to Figs. 3 and 4, wherein I have shown a modified form of my invention, this form is similar to that hereinbefore described with the exception that the tread of the tire is flat, as illustrated in Fig. 3, and I employ a somewhat different mode of joining the springs to each other to prevent their relative displacement in a circumferential direction. In this form of my invention, there are provided a series of substantially U-shaped springs 22 connected to each other by transverse connections 23 similar to the connections 7. An annular member 24 located preferably within the tire is provided with a series of perforations 25 in which are located, respectively, loops 26 formed upon the springs 22 and through these loops an annular wire 27 extends thus serving to lock the springs 22 to the member 24 and hold them in their proper spaced relation with each other. In this form of my invention also, the springs 22 may be bent to form corrugations, as shown in Fig. 3, for the purpose of preventing said slipping of the tire.

In the operation of both forms of my invention, the tire has a highly sensitive resilient action and is capable of local yielding in a manner much similar to that of a pneumatic tire, since a single transverse spring, or a small group of transverse springs, when subjected to pressure at the tread portion, will yield upwardly and flatten at the tread portion and bow outwardly at the sides.

Having thus described my invention, what I claim and desire by Letters Patent to secure is:

1. The combination with a wheel, of an elastic tire having two resilient sides connected to each other by chains forming an annular trough-like structure in which the periphery of said wheel is located.

2. The combination with a wheel, of an elastic tire having two resilient sides connected to each other by flexible non-elastic means forming an annular trough-like structure in which the periphery of said wheel is located.

3. The combination with a wheel, of an elastic tire comprising a series of transverse substantially U-shaped springs having outwardly-bowed arcuate sides, a pair of circumferential side members secured to opposite sides, respectively, of said springs, and flexible non-elastic means connecting said sides to each other and forming therewith an annular trough-like structure in which the periphery of said wheel is located.

4. The combination with a wheel, of an elastic tire comprising a series of transverse substantially U-shaped springs having outwardly bowed arcuate sides, means joining said springs to each other adjacent to the tread to prevent relative displacement of said springs in a circumferential direction, and flexible non-elastic means connecting the sides of said springs to each other and forming therewith a circumferential trough-like structure in which the periphery of said wheel is located.

5. The combination with a wheel, of an elastic tire comprising a series of transverse substantially U-shaped springs, a pair of circumferential side members provided respectively with circumferential grooves in which the ends of said springs terminate and are secured, and means connecting the sides of said springs to each other and forming therewith a circumferential trough-like structure in which the periphery of said wheel is located.

6. The combination with a wheel, of an elastic tire comprising a series of transverse substantially U-shaped springs, a pair of circumferential side members each in two parts forming therebetween an annular chamber, the opposite ends of said springs being located in said chambers, respectively, and means connecting the sides of said springs to each other and forming therewith a circumferential trough-like structure in which the periphery of said wheel is located.

7. The combination with a wheel, of an elastic tire comprising a series of transverse substantially U-shaped springs, a circumferential member provided with a series of perforations; said springs being respectively provided with loops extending through said perforations, respectively, means extending through said loop to lock the same to said circumferential member, and means connecting the sides of said springs to each other and forming therewith a circumferential trough-like structure in which the periphery of said wheel is located.

In testimony whereof I have hereunto set my hand in presence of two subscribing witnesses.

JOSEPH LAZARUS.

Witnesses:
 Louis A. Jones,
 Sadie V. McCarthy.